(12) United States Patent  
Ehlen

(10) Patent No.: US 10,332,105 B2  
(45) Date of Patent: Jun. 25, 2019

(54) PRE-TRANSACTION DATA EXCHANGE

(71) Applicant: MasterCard International Incorporated, Purchase, NY (US)

(72) Inventor: Ann Ehlen, Melsbroek (BE)

(73) Assignee: Mastercard International Incorporated, Purchase, NY (US)

( * ) Notice: Subject to any disclaimer, the term of this patent is extended or adjusted under 35 U.S.C. 154(b) by 825 days.

(21) Appl. No.: 14/559,060

(22) Filed: Dec. 3, 2014

(65) Prior Publication Data

US 2015/0154591 A1  Jun. 4, 2015

(51) Int. Cl.
```
G06Q 20/38     (2012.01)
G06Q 20/34     (2012.01)
G06Q 20/32     (2012.01)
G06Q 20/40     (2012.01)
```
(52) U.S. Cl.
CPC ............ *G06Q 20/38* (2013.01); *G06Q 20/32* (2013.01); *G06Q 20/3224* (2013.01); *G06Q 20/3255* (2013.01); *G06Q 20/34* (2013.01); *G06Q 20/4037* (2013.01)

(58) Field of Classification Search
CPC .................................................... G06Q 20/38
USPC .......................................................... 705/35
See application file for complete search history.

(56) References Cited

U.S. PATENT DOCUMENTS

| 2007/0194104 A1* | 8/2007 | Fukuda | G06Q 20/3437 235/379 |
| 2014/0278989 A1* | 9/2014 | Calman | G06Q 30/0215 705/14.55 |
| 2014/0279005 A1* | 9/2014 | Calman | G06Q 30/0215 705/14.58 |
| 2014/0279006 A1* | 9/2014 | Calman | G06Q 30/0215 705/14.58 |
| 2015/0186885 A1* | 7/2015 | Agrawal | G06Q 20/24 705/44 |

OTHER PUBLICATIONS

"A Security Framework for Card-Based Systems", Intl Conference on Financial Cryptography. FC 2001: Financial Cryptography. Abstract only. Conference Paper. First Online: Jul. 31, 2002. Part of the Lecture Notes in Computer Science book series. LNCS, vol. 2339. hereinafter Security Framework (Year: 2002).*

\* cited by examiner

*Primary Examiner* — Sara C Hamilton
(74) *Attorney, Agent, or Firm* — Buckley, Maschoff & Talwalkar LLC

(57) ABSTRACT

A computer implemented method of obtaining account data and merchant data, the method comprising the steps of: receiving a first request message from a user device at a third party, the first request message containing proposed transaction amount data, location data and payment card data; sending a second request message to a card issuer from the third party, the second request message containing a balance inquiry and payment card data; receiving a first response message from the card issuer at the third party, the first response message containing balance data related to the balance inquiry and payment card data; interrogating a database to obtain merchant data based on the location data; and sending a second response message to the user device from the third party, the second response message containing response data, related to the balance data, and the merchant data.

9 Claims, 5 Drawing Sheets

PRE-TRANSACTION DATA EXCHANGE

CROSS-REFERENCE TO RELATED APPLICATION

This application is a U.S. National Stage filing under 35 U.S.C. § 119, based on and claiming benefit of and priority to GB Patent Application No. 1321393.9 filed Dec. 4, 2013.

FIELD OF THE INVENTION

The present invention relates generally, but not exclusively, to a network which enables a card holder to more conveniently determine where they are able to use their payment card and whether they are able to perform a transaction of a specified amount.

BACKGROUND TO THE INVENTION

Situations often arise where a cardholder is unable to ascertain whether they are able to use a certain payment card (for example, a Maestro™ card) when making a purchase. Sometimes, retail shops, restaurants and other merchant premises do not explicitly advertise which type of payment cards they accept. Accordingly, the user of a specific card can find themselves in a position where they a desirous of purchasing an item, yet unaware of whether they are able to use their payment card to do so.

Situations can also arise where a cardholder wants to purchase an item of a specific value, but is unsure whether they have enough funds available in the account with which their payment card is associated for the purchase transaction to be authorised.

Accordingly, it is desirable to provide a cardholder with the means of conveniently and efficiently ascertaining whether a merchant will accept their type of card and/or whether they have sufficient funds in their account to make a purchase or perform a transaction of a specific value.

SUMMARY OF INVENTION

The present invention relates, in part, to a mobile phone application that allows the cardholder to privately confirm their ability to make a purchase with that card without risking being declined or not having their only payment card accepted.

According to a first aspect of the invention, there is provided a computer implemented method of obtaining account data and merchant data, the method comprising the steps of: receiving a first request message from a user device at a third party, the first request message containing proposed transaction amount data, location data and payment card data; sending a second request message to a card issuer from the third party, the second request message containing a balance inquiry and payment card data; receiving a first response message from the card issuer at the third party, the first response message containing balance data related to the balance inquiry and payment card data; interrogating a database to obtain merchant data based on the location data; and sending a second response message to the user device from the third party, the second response message containing response data, related to the balance data, and the merchant data.

Typically, the location data of the first aspect of the invention comprises the geographical location of the user device.

According to a second aspect of the invention, there is provided a computer implemented method of obtaining account data and merchant data, the method comprising the steps of: receiving a first request message from a user device at a third party, the first request message containing proposed transaction amount data, proposed merchant data and payment card data; sending a second request message to a card issuer from the third party, the second request message containing a balance inquiry and payment card data; receiving a first response message from the card issuer at the third party, the first response message containing balance data related to balance inquiry and payment card data; interrogating a database to obtain merchant data based on the proposed merchant data; and sending a second response message to the user device from the third party, the second response message containing response data, related to the balance data, and the merchant data.

Advantageously, the methods of the first and second aspects of the invention provide the user with the means of ascertaining whether their card is accepted by a merchant and/or whether they are able to make a transaction of a specified value. This information can be obtained efficiently and conveniently via the user device.

Typically, the method of either of the first and second aspects of the invention further includes the step of determining, at the third party, whether a transaction can be performed based upon the proposed transaction amount data and the balance data and incorporating the result of the determination into the response data.

Typically, the user device of either of the first and second aspects of the invention is one of: a mobile phone, a tablet, a laptop, or other such portable device with processing and communications capabilities.

Typically, the response data of either of the first and second aspects of the invention comprises an indication of whether or not a payment of the proposed transaction amount can be made using a payment card to which the payment card data corresponds.

Typically, the merchant data of either of the first and second aspects of the invention comprises an indication of whether a merchant accepts payment from a type of payment card to which the payment card data relates.

Typically, the response data of either of the first and second aspects of the invention further comprises the remaining available balance of a payment card to which the payment card data relates.

According to a third aspect of the invention, there is provided a server configured to carry out the method steps of either of the first and second aspects of the invention.

Typically, the database of the third aspect of the invention is hosted by the server.

According to a fourth aspect of the invention, there is provided a processor configured to carry out the steps of: sending a request message to a third party, the first request message containing proposed transaction amount data, proposed merchant data and/or location data, and payment card data; and receiving a response message from a third party, the second response message containing response data related to the proposed transaction amount data and merchant data related to the proposed merchant data and/or location data.

Typically, the response data of the fourth aspect of the invention comprises an indication of whether or not a payment of the proposed transaction amount can be made using a payment card to which the payment card data corresponds.

Typically, the merchant data of the fourth aspect of the invention comprises an indication of whether a merchant accepts payment from a type of payment card to which the payment card data relates.

Typically, the response data of the fourth aspect of the invention further comprises the remaining available balance of a payment card to which the payment card data relates.

BRIEF DESCRIPTION OF DRAWINGS

Embodiments of the present invention will now be described, by way of example only, with reference to the accompanying drawings, in which.

DETAILED DESCRIPTION

The present invention provides a system which enables the user to easily obtain information regarding the type of cards that a merchant will accept. This obviates the need for the user to go into or approach the merchant's premises and enquire as to what cards are accepted.

The system of present invention also enables the user to easily ascertain whether they have enough funds available to make a purchase for a particular amount by obtaining the total amount of funds available to them. The user can therefore determine, in advance, whether a particular transaction will be possible, and can therefore avoid potential uncertainty and embarrassment.

These two functions of the present system may be performed independently or simultaneously.

Figure 1:
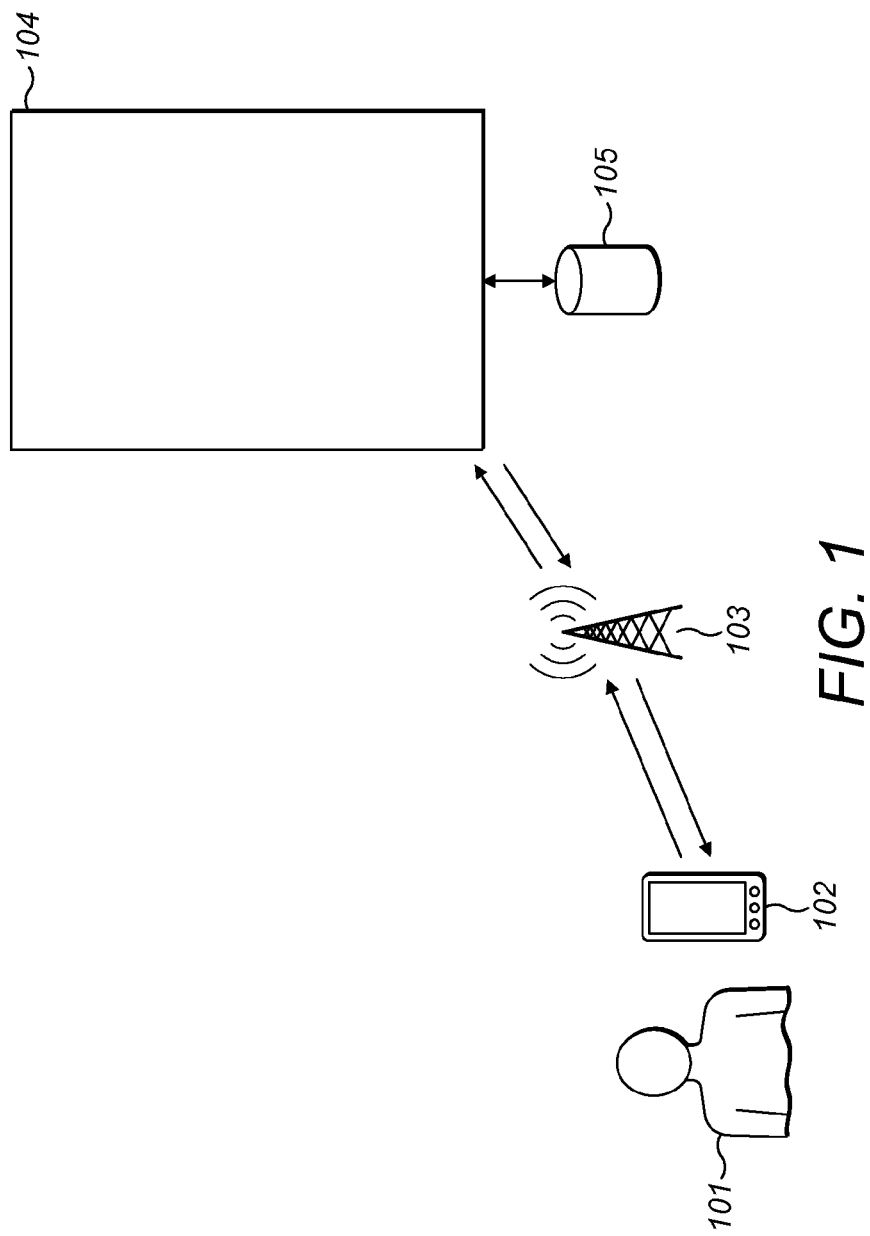
FIG. 1 depicts the parties involved in an exemplary system for providing the user with information regarding a merchant and the type of cards that a merchant will accept.

FIG. 1 depicts the parties involved in an exemplary system for providing the user with information regarding a merchant and the type of cards that a merchant will accept. The parties involved are a user 101, a user device 102, a network 103 (for example, a mobile communications network), a third party 104 and a database 105.

The user 101 can use the user device 102 to send a request message to the third party 104 via the network 103. The user device may be a mobile phone (depicted), but other suitable devices include, but are not limited to, a laptop, tablet or indeed any device which can transmit and receive data over a network.

The communications network 103 may be a mobile communications network, for example, the network may be one of GSM, GPRS, cdmaOne, CDMA2000, EV-DO, EDGE, UMTS, DECT, IS-136/TDMA, iDEN or any other suitable network which is known in the field. The network 103 may also be a data network, for example, the network may be one of WAN, MAN, LAN, WLAN, IAN, CAN, VPN or any other suitable network which is known in the field.

The third party 104 may be, but is not limited to being, any suitable server, network or system which is capable of providing the herein described functionality provided by the third party, as would be understood by a person skilled in the art.

The request message contains details of the user's payment card. The payment card may be a standard credit, debit, charge or stored value card. It may also be a virtual card which has no physical presence. Alternatively, the account details of an account associated with the user may be used in place or alongside the payment card details.

In one embodiment, only the de minimis information needed to identify the user's payment card type is transferred. Advantageously, such an embodiment provides improved privacy and security. For example, the identification may be done from the payment card's Bank Identification Number (BIN) (also called the Issuer Identification Number (IIN)). All card programmes are registered using the first six digits of their Primary Account Number PAN, the so-called BIN. It will be understood that where the phrase 'payment card data' is used herein, it may encompass such de minimis information.

It will be understood that wherever payment card details or payment card data are described or used in relation to any of the embodiments as described herein, account details or account data may be used either alongside or in place of payment card details or payment card data.

The request message also contains details of a particular merchant and/or details of the location of the user device 102.

The request message is preferably sent over a secure channel or is itself securely encrypted. The message may be sent via SMS, email or any other suitable known means for transmitting data over a network.

The request message is received by the third party 104 which uses the contents of the received message to interrogate a database 105. For example, the third party 104 may use one or more of the details of the user's payment card, the details of a particular merchant (for example, the name, address phone number) and the details of the location of the user device 102 in order to extract the appropriate information or data from the database.

The database 105 contains details of merchants, including their names, geographical location and the type of payment cards they accept. The third party 104 may then perform one or more of the following three actions.

1) The third party 104 may use the received details of the location of the user device 102 when interrogating the database 105 in order to retrieve information on all the merchants within a predetermined radius of the location of the user device 102. This information may then be returned to the user device 102 as part of a response message.

2) The third party 104 may use the received details of the user's payment card when interrogating the database 105 in order to retrieve information on all the merchants which accept that type of payment card. This information may then be returned to the user device 102 as part of a response message.

3) The third party 104 may use the received details of the particular merchant when interrogating the database 105 in order to retrieve information on that specific merchant (or, for example, where the details of the particular merchant includes just the merchant's name/address/phone number, information on all merchants with that name/address/phone number). This information may then be returned to the user device 102 as part of a response message.

These three actions may be performed in isolation or in any combination. The third party 104 may, for example, interrogate the database 105 using both details of the location of the user device 102 and the details of the user's payment card. Using this information, the third party 104 could then produce a list of all the merchants within a predetermined radius of the location of the user device 102 and which accept the user's type of payment card. This information may then be returned to the user device 102 as part of a response message.

Alternatively, the third party 104 may, for example, interrogate the database 105 using both details of the particular merchant and the details of the user's payment card. Using this information, the third party 104 could then ascertain whether that particular merchant accepts the user's type of payment card. This information may then be returned to the user device 102 as part of a response message.

Figure 2:
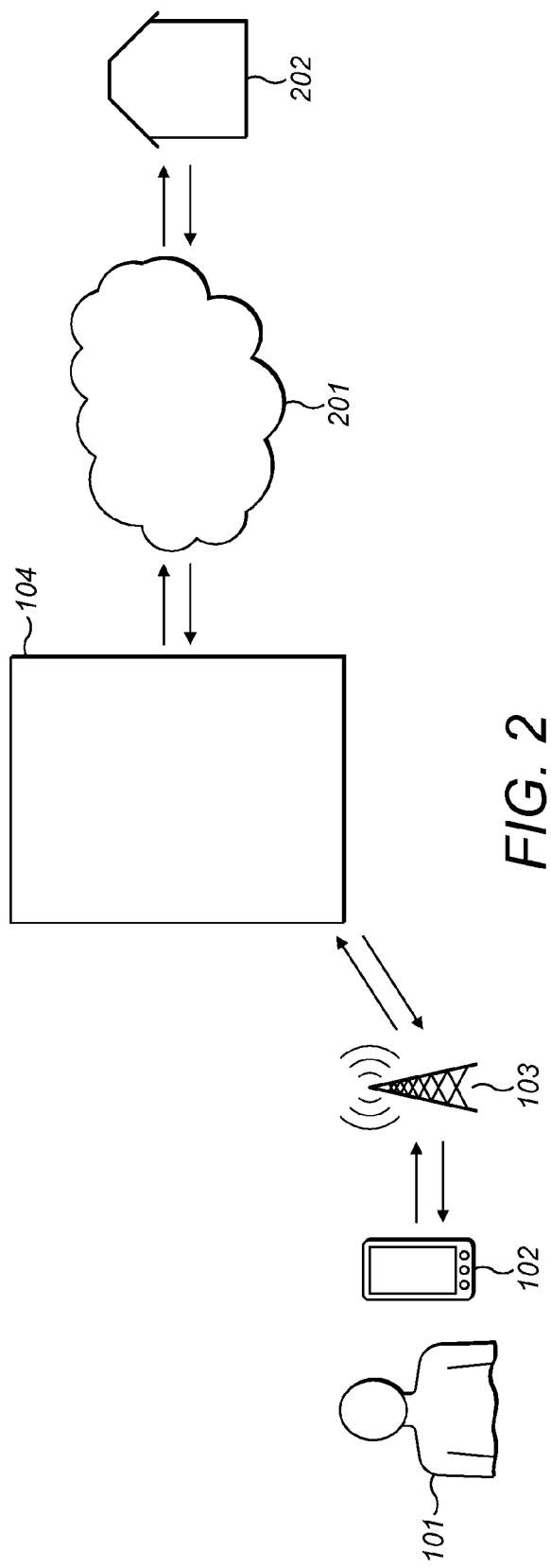
FIG. 2 depicts the parties involved in an exemplary system for providing the user with information on an account associated with a payment card.

FIG. 2 depicts the parties involved in an exemplary system for providing the user with information on an account associated with a payment card. In addition to the parties 101, 102, 103 and 104, which are the same as the parties described with reference to FIG. 1, there is also a second network 201 and an issuer 202. The second network 201 may be any suitable known network for connecting and exchanging data between two parties. For example, the known Banknet™ network operated by MasterCard™ would be suitable. The issuer 202 is preferably the issuer of a payment card belonging to the user 101 and is in control of the account associated with the payment card.

The user 101 can use the user device 102 to send a request message to the third party 104 via the network 103. The request message, as described above, contains details of the user's payment card. In addition, in this embodiment, the request message also contains details of a proposed transaction amount (for example, £200) and/or a request for available funds.

The request message is received by the third party 104 which then forwards the message on to the issuer 202 via the second network 201 as part of a further request message. The issuer 202 interrogates the associated account and then sends a response message to the third party 104 via the second network 201.

Here, the third party 104 may contact the issuer 202 for the available balance in the associated account. This may be done using existing standard balance inquiry protocols. Based on the information received, the third party 104 determines whether or not the purchase of the value of the proposed transaction amount is possible, for example, by determining that the proposed transaction amount is below the available balance in the account.

Alternatively, the third party 104 may provide the issuer 202 with the proposed transaction amount data and payment card data. The issuer 202 may then provide the third party 104 with an indication of whether or not the purchase of the value of the proposed transaction amount is possible. This alternative method may be used in each of the embodiments described herein where possible.

Importantly, the third party 104 does not initiate an authorization request. Such an action would put the funds in the associated account on hold, making them unavailable for the purchase.

Where the third party 104 itself determines whether or not the purchase of the value of the proposed transaction amount is possible the following steps may happen.

Where the third party 104 determines that account associated with the payment card contains sufficient funds to meet the proposed transaction amount based on the balance information received from the issuer 202, the third party 104 sends a further response message containing a positive indication: for example, a 'yes' message to the user device 102 via the network 103.

Where the third party 104 determines that account associated with the payment card contains insufficient funds to meet the proposed transaction amount based on the balance information received from the issuer 202, the third party 104 sends a further response message containing a negative indication: for example, a 'no' message to the user device 102 via the network 103.

Where the issuer 202 has provided the third party 104 with an indication of whether or not the purchase of the value of the proposed transaction amount is possible the following steps may happen.

Where details of a proposed transaction amount are included in the request message and where the account associated with the payment card contains sufficient funds to meet the proposed transaction amount, the response message contains a positive indication: for example, a 'yes' message. Where there are insufficient funds to meet the proposed transaction amount, the response message contains a negative indication: for example, a 'no' message. The third party 104 then transmits this message to the user device 102 via the network 103 as part of a further response message.

Where details of a request for available funds are included in the request message, the same processes are observed. However, the response message and further response message further contain additional details of the funds available in the account associated with the payment card.

Where the request message contains details of a proposed transaction amount and a request for available funds, the response message and further response message will contain both details of the funds available in the account associated with the payment card and either a positive or a negative indication, as outlined above.

Figure 3:
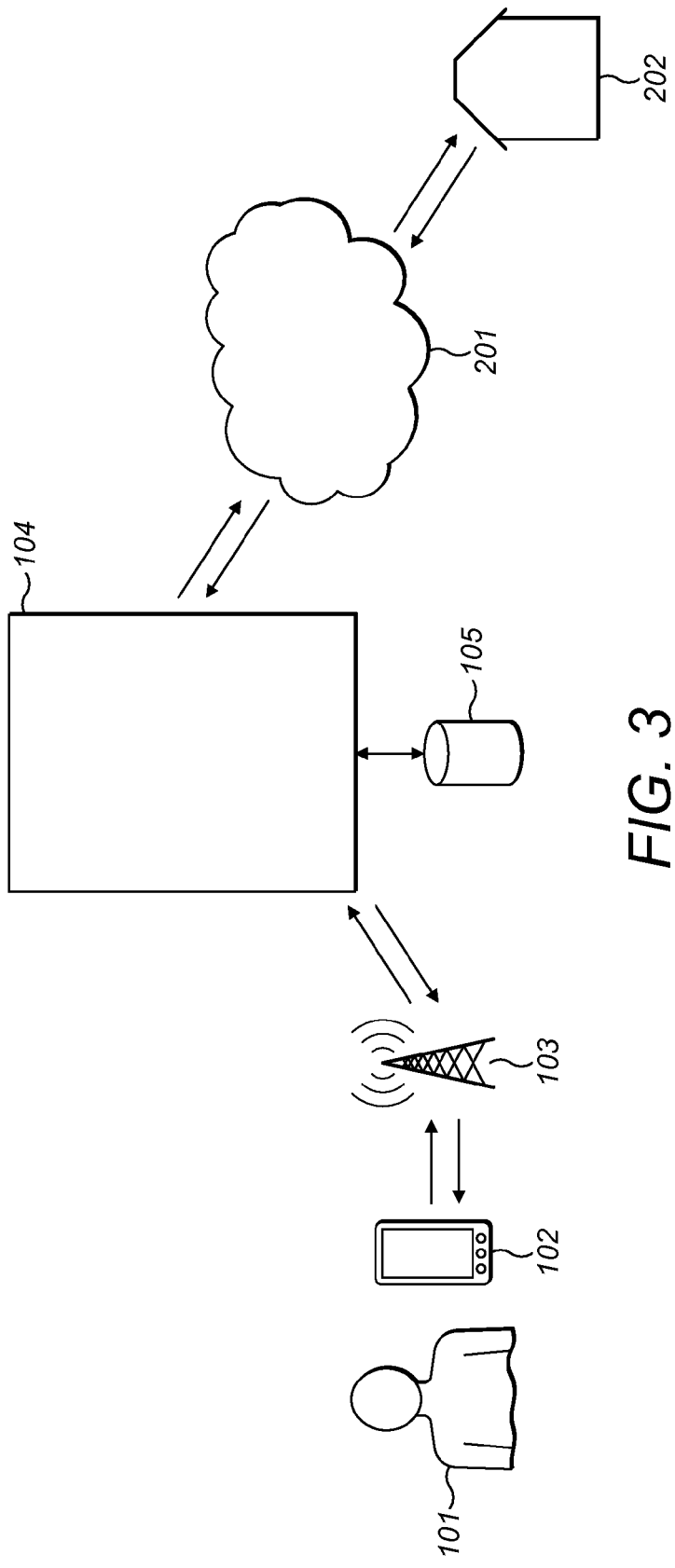
FIG. 3 depicts the parties involved in an exemplary system which combines the systems of FIGS. 1 and 2.

FIG. 3 depicts the parties involved in an exemplary system which combines the systems of FIGS. 1 and 2. The parties involved are a user 101, a user device 102, a network 103, a third party 104, a database 105 a second network 201 and an issuer 202, substantially as described above.

The processes are much the same as those described in relation to FIGS. 1 and 2. However, the request message sent by the user device 102 may contain one or more of details of the user's payment card, details of a particular merchant, details of the location of the user device 102, details of a proposed transaction amount and a request for available funds. These details may be included in the request message in isolation or in any combination and, upon the inclusion of one or more details in the request message, the system shown in FIG. 3 would respond by performing the steps associated with each of the details as described above.

In each of the above described exemplary systems, the third party 104 may comprise a server (not shown), configured to carry out the steps of:

receiving a first request message from a user device 102, the first request message containing proposed transaction amount data, location data (or, alternatively, proposed merchant data) and payment card data;

sending a second request message to a card issuer 202, the second request message containing a balance inquiry (or, alternatively, the proposed transaction amount data and payment card data);

receiving a first response message from the card issuer 202, the first response message containing response data related to the balance availability (or, alternatively, the proposed transaction amount data);

interrogating a database 105 and obtaining merchant data based on the location data; and sending a second response message to the user device 102, the second response message containing the response data and the merchant data.

In each of the above described exemplary systems, the first request message may be sent and the second response message may be received at the user device 102 via an application (app) installed on the user device 102 or via a browser installed on the user device 102 by accessing a web page via the browser.

Figure 4:
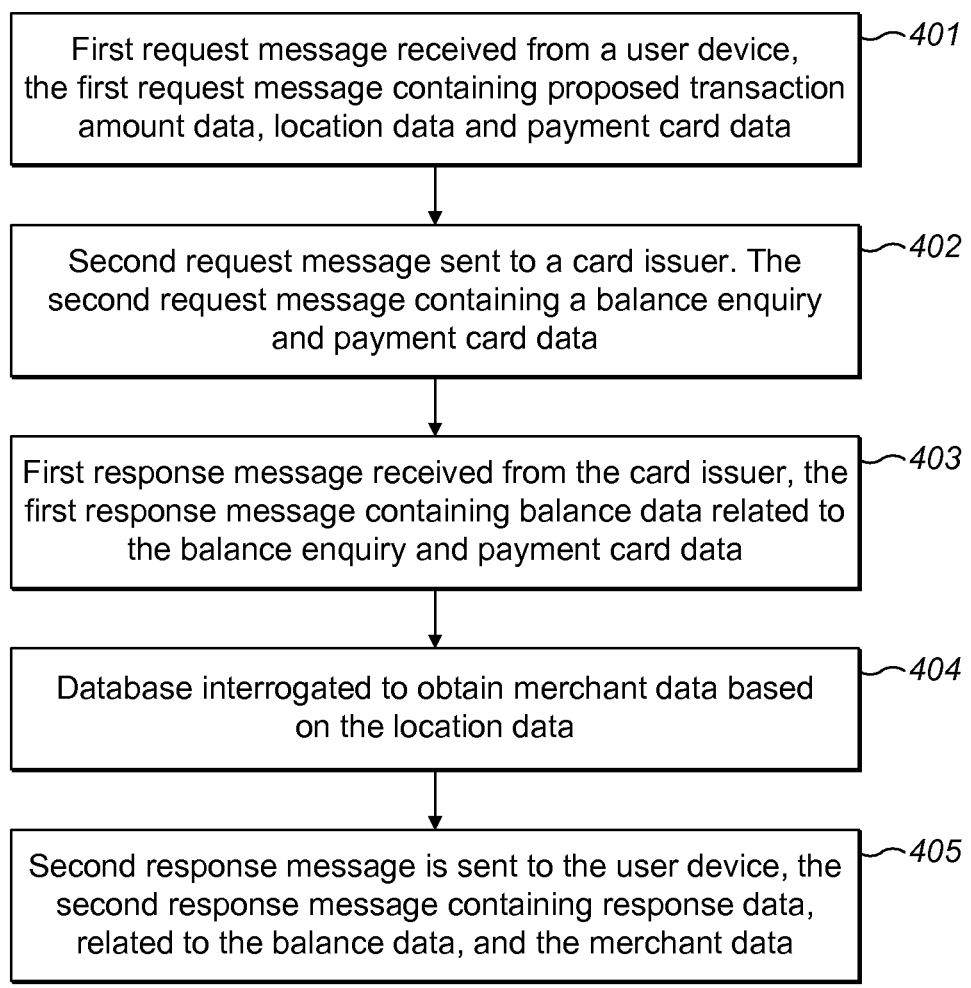
FIG. 4 is a flow diagram of the computer-implemented processes performed according to an embodiment of the invention.

FIG. 4 is a flow diagram of the computer-implemented processes performed according to an embodiment of the invention.

In step 401, a first request message is received from a user device 102, the first request message containing proposed transaction amount data, location data and payment card data.

In step 402, a second request message is sent to an issuer 202. The request message may contain a balance inquiry and payment card data.

In step 403, a first response message is received from the card issuer, the first response message containing balance data related to the balance inquiry and payment card data.

In step 404, a database 105 is interrogated to obtain merchant data based on the location data.

In step 405, a second response message is sent to the user device, the second response message containing response data, related to the balance data, and the merchant data.

Optionally, the step of determining whether a transaction can be performed based upon the proposed transaction amount data and the balance data and incorporating the result of the determination into the response data (not shown) may be performed.

Figure 5:
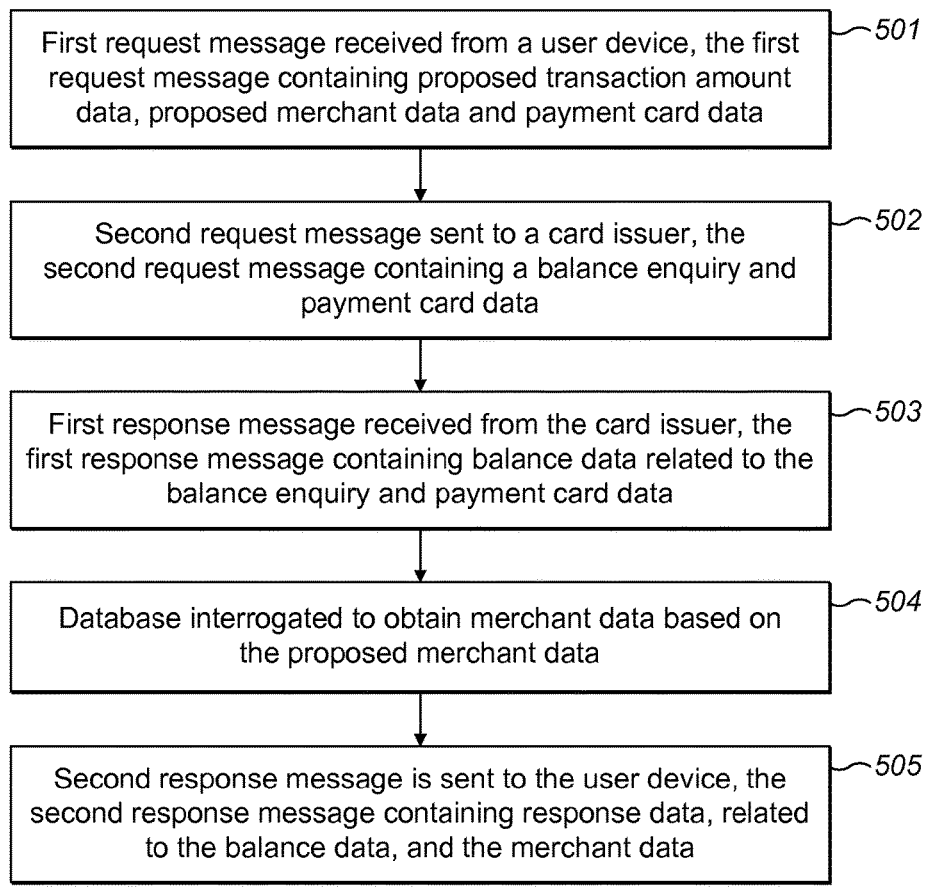
FIG. 5 is a flow diagram of the computer-implemented processes performed according to an embodiment of the invention.

FIG. 5 is a flow diagram of the computer-implemented processes performed according to an embodiment of the invention.

In step 501, a first request message is received from a user device 102, the first request message containing proposed transaction amount data, proposed merchant data and payment card data.

In step 502, a second request message is sent to an issuer 202. The second request message may contain a balance inquiry and payment card data.

In step 503, a first response message is received from the card issuer, the first response message containing balance data related to the balance inquiry and payment card data.

In step 504, a database 105 is interrogated to obtain merchant data based on the proposed merchant data.

In step 505, a second response message is sent to the user device, the second response message containing response data, related to the balance data, and the merchant data.

Optionally, the step of determining whether a transaction can be performed based upon the proposed transaction amount data and the balance data and incorporating the result of the determination into the response data (not shown) may be performed.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A computer-implemented method comprising:

receiving, by a third party server via a first network before a purchase transaction is conducted, a first request message from a user device via a mobile application installed on the user device, the first request message containing proposed transaction amount data, proposed merchant data and payment card data;

sending, by the third party server via a second network, a second request message to a card issuer, the second request message containing a balance inquiry and the payment card data;

receiving, by the third party server via the second network, a first response message from the card issuer, the first response message containing balance data related to the balance inquiry and the payment card data;

determining, by the third party server and based on the first response message received from the card issuer, that the purchase transaction can be performed based upon the proposed transaction amount data and the balance data, wherein determining that the purchase transaction can be performed based upon the proposed transaction amount data and the balance data includes determining that the proposed transaction amount is below an available balance indicated by the balance data;

interrogating, by the third party server, a database to obtain merchant data based on the proposed merchant data, the merchant data comprises an indication of whether a merchant accepts payment from a type of payment card to which the payment card data relates; and sending, by the third party server via the first network, a second response message to the user device via the mobile application installed on the user device, the second response message containing response data, wherein the response data indicates the purchase transaction can be performed based upon the proposed transaction amount data and indicates whether the merchant accepts payment from the type of payment card to which the payment card data related, wherein a user of the user device conducts the purchase transaction based on the second response message.

2. The method of claim 1, wherein the first request message comprises a first encrypted request message.

3. The method of claim 1, wherein the user device is one of: a mobile phone, a tablet, a laptop, or other such portable device with processing and communications capabilities.

4. The method of claim 1, wherein the first request message further contains a location of the user device, and the merchant data obtained by said interrogating is associated with a predetermined radius from the location of the user device.

5. A system, comprising:

a database having stored thereon merchant data which comprises an indication of whether a merchant accepts payment from a type of payment card to which the payment card data relates; and a processor in communication with the database, the processor programmed to perform the operations of:

receiving, by a third party server via a first network before a purchase transaction is conducted, a first request message from a user device via a mobile application installed on the user device, the first request message containing proposed transaction amount data, proposed merchant data and payment card data;

sending, by the third party server via a second network, a second request message to a card issuer, the second request message containing a balance inquiry and the payment card data;

receiving, by the third party server via the second network, a first response message from the card issuer, the first response message containing balance data related to the balance inquiry and the payment card data;

determining, by the third party server and based on the first response message received from the card issuer, that the purchase transaction can be performed based upon the proposed transaction amount data and the balance data, wherein determining that the purchase transaction can be performed based upon the proposed transaction amount data and the balance data includes determining that the proposed transaction amount is below an available balance indicated by the balance data;

interrogating, by the third party server, the database to obtain the merchant data based on the proposed merchant data; and sending, by the third party server via the first network, a second response message to the user device via the mobile application installed on the user device, the second response message containing response data, wherein the response data indicates the purchase transaction can be performed based upon the proposed transaction amount data and indicates whether the merchant accepts payment from the type of payment card to which the payment card data related, wherein a user of the user device conducts the purchase transaction based on the second response message.

6. The system of claim 5, wherein the database is hosted by a server.

7. The system of claim 5, wherein the first request message comprises a first encrypted request message.

8. The system of claim 5, wherein the user device is one of: a mobile phone, a tablet, a laptop, or other such portable device with processing and communications capabilities.

9. The system of claim 5, wherein the first request message further contains a location of the user device, and the merchant data obtained by said interrogating is associated with a predetermined radius from the location of the user device.

* * * * *